United States Patent [19]
Miyake et al.

[11] 3,891,361
[45] June 24, 1975

[54] OIL SEAL MEANS OF A ROTARY PISTON ENGINE

[75] Inventors: Joji Miyake; Takeshi Nakakobara, both of Toyota, Japan

[73] Assignee: Toyota Jidosha Kogyo Kabushiki Kaisha, Tokyo, Japan

[22] Filed: Dec. 13, 1973

[21] Appl. No.: 424,327

[30] Foreign Application Priority Data

| | | |
|---|---|---|
| July 18, 1973 | Japan | 48-80285 |
| July 18, 1973 | Japan | 48-80287 |
| July 18, 1973 | Japan | 48-80288 |
| July 18, 1973 | Japan | 48-80289 |

[52] U.S. Cl. ............... 418/142; 267/1.5; 267/129
[51] Int. Cl. ....... F01c 19/00; F04c 27/00; F16f 1/34
[58] Field of Search .......... 418/142; 277/158, 159; 267/1.5, 129

[56] References Cited
UNITED STATES PATENTS

| | | | |
|---|---|---|---|
| 1,516,327 | 11/1924 | Brownfield | 277/159 |
| 3,171,590 | 3/1965 | Bentele et al. | 418/142 |
| 3,323,712 | 6/1967 | Froede et al. | 418/142 |

FOREIGN PATENTS OR APPLICATIONS

| | | | |
|---|---|---|---|
| 939,189 | 10/1963 | United Kingdom | 418/142 |

*Primary Examiner*—John J. Vrablik
*Attorney, Agent, or Firm*—Stewart and Kolasch

[57] ABSTRACT

An oil seal means for sealing oil and gas tightness between the rotor and the side housing of a rotary piston engine, wherein an oil seal ring is made of a relatively thin plate formed into a channel-like structure including a first annular portion extending over a substantially conical surface, a second annular portion extending over a substantially cylindrical surface and a third substantially annular portion extending over a substantially conical surface but separated into a series of sectoral elements each being adapted to operate as a leaf spring to resiliently urge the oil seal ring outwardly from an annular oil seal groove in which the ring is mounted towards the inside surface of the side housing to keep oil and gas tightness therebetween. The ring may be provided with an annular elastic belt member attached to the sectoral elements or may be further provided with a second series of sectoral elements, to which the annular elastic belt member may be attached.

16 Claims, 15 Drawing Figures

PATENTED JUN 24 1975 3,891,361

SHEET 3

OIL SEAL MEANS OF A ROTARY PISTON ENGINE

BACKGROUND OF THE INVENTION

1. Field of the Invention

This invention relates to an oil seal means of rotary engines, and more particularly, an oil seal means to be mounted at a side wall portion of a rotor to keep oil and gas tightness between the side wall portion of the rotor and a side housing of a rotary engine.

1. Description of the Prior Art

A rotary engine has a general structure as shown in FIG. 1, wherein a center housing 1 having an inside surface of a trochoidal cross sectional configuration and side housings 2 closing opposite sides of the center housing, define a chamber therebetween, in which is positioned a rotor 4 which is movable about an eccentric shaft 3 in a planetary movement. When the rotor rotates in said chamber, the oil and gas tightness between the side wall of the rotor and the inside surface of the side housing is maintained by an oil seal means generally designated by reference numeral 5. Conventionally, such an oil seal means has the general structure as shown in FIG. 3. Referring to FIG. 3, 6 is an annular oil seal groove formed as cut at the side wall portion of the rotor. In the annular oil seal groove is inserted an oil seal ring 7, which is exerted with a spring force by a corrugated spring 8 mounted between the bottom wall of the groove 6 and the bottom face portion of said ring so that the ring is urged outwardly of said groove to contact with the inside surface of the side housing 2 at the tip end portion thereof so as to maintain the oil and gas tightness therebetween. Furthermore, in order to intercept a fluid passage crossing an annular space left between the ring 7 and the groove 6 so as to prevent the leakage of oil and gases through said fluid passage, there is provided an O-ring 10 made of an elastic material in a groove 9 formed in the oil seal ring 7.

However, the conventional oil seal means of the abovementioned structure contains various drawbacks such that it requires a number of parts and, therefore, the manufacturing cost is high, also, the followability of the oil seal means to the irregularly oscillating movement of the rotor at a high speed operating condition, that is unavoidably caused according to the rotation of the rotor due to some clearances at the bearing means interposed between the rotor and the eccentric shaft, is poor. In addition, the durability of the corrugated spring 8 is relatively poor.

SUMMARY OF THE INVENTION

Therefore, it is the object of this invention to provide an improved oil seal means which is free from the abovementioned drawbacks in the conventional oil seal means.

The abovementioned object is accomplished, according to this invention, by an oil seal means of a rotary piston engine comprising an oil seal ring and an annular elastic sealing element, both being mounted in combination in an annular oil seal groove formed as cut at a side wall portion of a rotor, characterized in that said oil seal ring is composed of a first annular portion made of a relatively thin plate extending over a substantially conical surface, a second annular portion made of a relatively thin plate extending over a substantially cylindrical surface and connected at an annular edge thereof with an annular edge of said first annular portion, and a third substantially annular portion made of a relatively thin plate extending over a substantially conical surface and connected at an annular edge thereof with the other annular edge of said second annular portion, said third annular portion being actually separated into a plurality of sectoral elements arranged in series to provide as a whole a substantially annular element.

According to a particular feature of this invention, said sectoral elements may each be closely arranged with adjacent ones leaving a slice gap formed therebetween to sever one from another.

According to another feature of this invention, said sectoral elements may each be substantially spaced from adjacent ones to the extent that the portions having been residing therebetween are displaced therefrom.

According to still another feature of this invention, said displaced portion may be adapted to form a plurality of leaf spring members of the oil seal ring reacting against a side wall portion of said annular oil seal groove.

According to a still further feature of this invention, said annular elastic sealing element may be an O-ring received in the channel defined by said first, second and third annular portion.

However, in the case that the oil seal ring includes the abovementioned displaced portions, an O-ring may be received in the channel defined by said second and third annular portions and said plurality of leaf spring members.

In place of the conventional O-ring, a flat belt ring member may preferably be attached to said third annular portion to operate as an annular elastic sealing element. Alternatively, such a flat belt ring member may be attached to said leaf spring members in a manner of also bridging these members while operating as the annular elastic sealing element.

According to a still further feature of this invention, said oil seal ring may be provided with a thin anti-wearing layer at least at an outer surface of said first annular portion where it contacts the inside surface of the side housing so that the anti-wearing performance is much improved.

BRIEF DESCRIPTION OF THE DRAWING

In the accompanying drawing.

DESCRIPTION OF THE PREFERRED EMBODIMENT

In the following, this invention will be described in more detail with respect to the preferred embodiments and with particular reference to the accompanying drawing.

Figure 1:
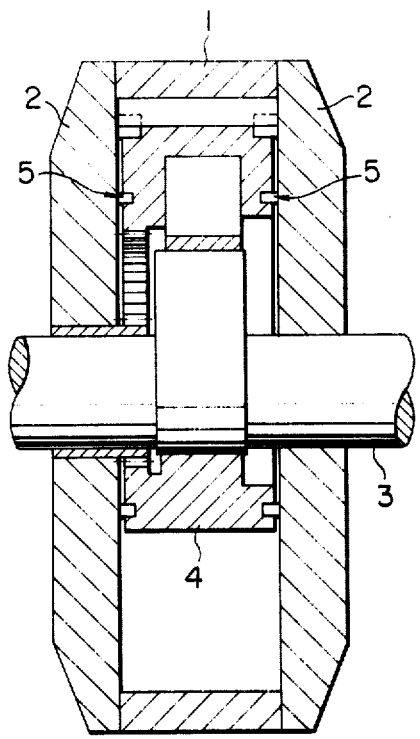
FIG. 1 is an axially sectional view of an example of the rotary piston engine in which this invention is to be incorporated.
Figure 2:
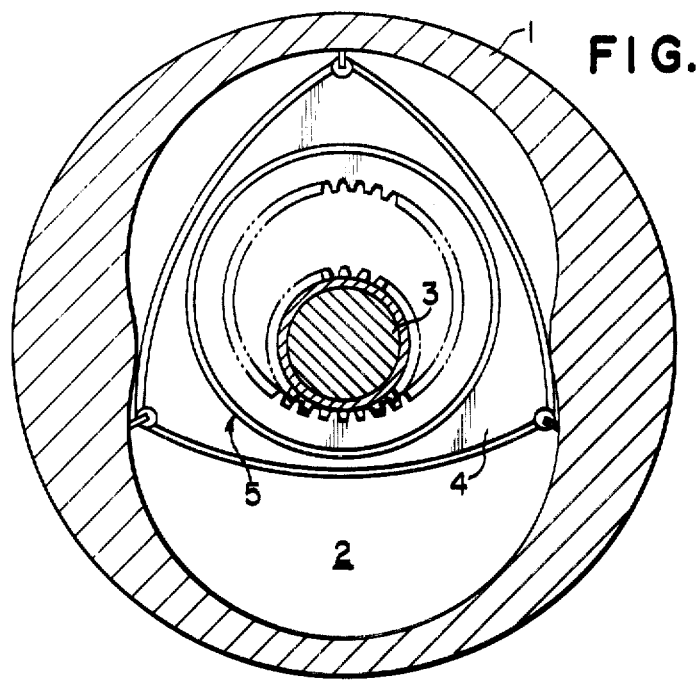
FIG. 2 is a side view of the engine shown in FIG. 1, but showing the same with one of the side housings being removed for the purpose of illustration.
Figure 3:
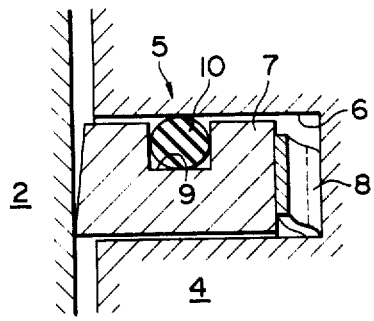
FIG. 3 is a sectional view showing an example of a conventional oil seal means provided at the side wall portion of the rotor.
Figure 4:
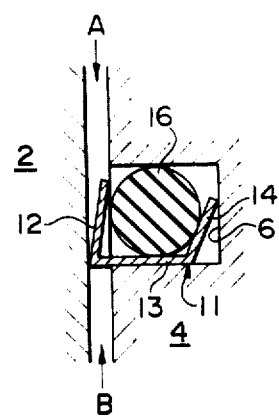
FIG. 4 is a view similar to FIG. 3 showing a first embodiment of the oil seal means according to this invention.

Referring first to FIG. 4, which shows the first embodiment of the oil seal means according to this invention in the same cross sectional manner as in FIG. 3, the portions corresponding to those shown in FIG. 3 being designated by the same reference numerals.

In FIG. 4, the oil seal ring generally designated by reference numeral 11 is composed of a first annular portion 12 made of a relatively thin plate extending over a substantially conical surface so as to be inclined with respect to the inside surface of the side housing 2 and to contact therewith at the inner peripheral portion thereof, a second annular portion 13 made of a relatively thin plate extending over a substantially cylindrical surface to follow the radially inside wall of the annular oil seal groove 6 and connected at an annular edge thereof with the inside peripheral portion of said first annular portion, and a third annular portion 14 made of a relatively thin plate extending over a substantially conical surface so as to be inclined with respect to the bottom wall of the annular oil seal groove to be connected at its inner edge portion with the other annular edge of said second annular portion and to abut against the bottom wall of the annular oil seal groove at its outer free edge portion. However, as clearly shown in FIG. 5, the third annular portion 14 is actually separated into a plurality of sectoral elements arranged in series by cuts 15 extending in radial directions, whereby each sectoral element can rotate about an axis extending along the connecting portion thereof with the second annular portion 13 so as to independently exert a spring force acting in the direction of the rotor axis to the corresponding portion of the oil seal ring so that the oil seal ring is effectively supported by a plurality of springs arranged in the annular direction thereof.

By the structure that the first annular portion 12 is made of a plate extending over a conical surface thereby to contact the inner surface of the side housing at the inner peripheral portion thereof as shown in FIG. 4, the tip or lip structure of the oil seal ring can have a proper resiliency as well as rigidity necessary to obtain a good performance by catching and recovering oil by the wedging effect that is being transferred in the direction of arrow A due to the gas pressure generated in the operating chamber and by scraping the oil transferred from the side of the eccentric shaft 3 in the direction of arrow B to prevent leakage of oil.

In order to prevent oil or gas flow across the annular space left between the oil seal ring 11 and the annular oil seal groove 6, the structure shown in FIG. 4 incorporates an O-ring 16 made of an elastic material such as rubber positioned so as to intercept the fluid passage crossing said annular space.

It will be appreciated that the oil seal ring 11 composed of the annular portions 12-14 can easily be manufactured from sheet material by a punching-out process, etc., to a great advantage in view of its manufacturing costs. Furthermore, since the oil seal ring according to this invention incorporates, in itself, a function of the seal spring, it is only necessary to combine the oil seal ring with the O-ring 16 and to insert them into the annular oil seal groove 6 to instantly complete the oil seal means. From this fact, it will be further appreciated that the oil seal means according to the present invention is very advantageous in view of its manufacturing cost and its operational advantages, such as its good followability as mentioned above.

Figure 6:
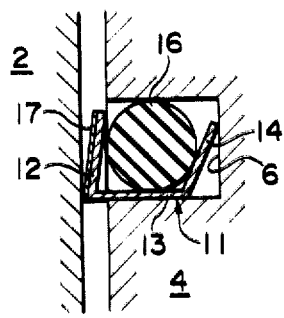
FIG. 6 is a view similar to FIG. 4 but showing a little modification of the structure shown in FIG. 4.

FIG. 6 shows a modification of the oil seal means shown in FIG. 4, wherein the oil seal ring 11 is provided with an anti-wearing film layer 17 attached over the outer surface of the first annular portion 12, said film being made of a material having a superior anti-wearing characteristic such as chromium, etc., as compared with the sheet material forming the annular portion, said material being formed into said film layer by welding injection or plating. By utilizing the anti-wearing film layer, the anti-wearing performance of the tip or lip portion of the oil seal ring is improved, whereby the life time of the oil seal means is extended and a stable oil and gas tightness is attained for a long period of operation.

Figure 5:
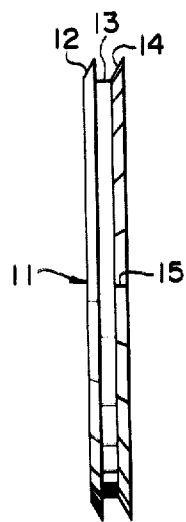
FIG. 5 is a side view of an oil seal ring incorporated in the structure shown in FIG. 4.
Figure 7:
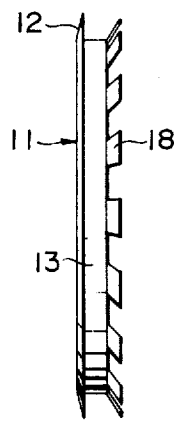
FIG. 7 is a view similar to FIG. 5 but showing a further modification of the oil seal ring.

FIG. 7 shows a little modification of the oil seal ring shown in FIG. 5 in that the sectoral elements are each substantially spaced from adjacent ones to clearly define independent sectoral elements 18 each being adapted to operate as a completely independent leaf spring to resiliently support the oil seal ring which is urged outwardly from the annular oil seal groove toward the inside surface of the side housing.

The oil seal ring shown in FIG. 7 may be incorporated in the oil seal structure as shown in FIG. 4 in quite the same manner in combination with the O-ring and with or without the anti-wearing film layer provided at the outer surface of the first annular portion thereof. In this case, the spring action of the oil seal ring shown in FIG. 7 can be made as soft as required by properly selecting the spacing between the adjacent sectoral elements 18.

Figure 9:
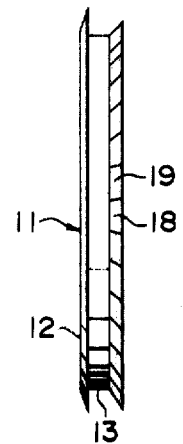
FIG. 9 is a side view of the oil seal ring incorporated in the structure shown in FIG. 8.
Figure 8:
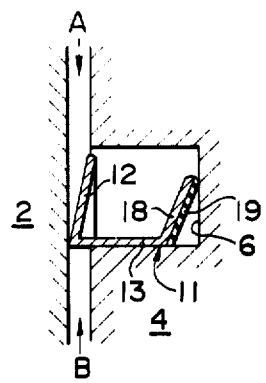
FIG. 8 is a view similar to FIGS. 4 and 6 but showing a second embodiment of the oil seal means according to this invention.

FIGS. 8 and 9 show another embodiment of this invention, wherein the oil seal ring 11 substantially of the same type as that shown in FIG. 7 is used in substantially the same manner as shown in FIG. 4 as the parts corresponding to those shown in the preceding figures are designated by the same reference numerals in FIGS. 8 and 9. However, in the structure shown in FIG. 8, the conventional O-ring is eliminated and in place thereof the oil seal ring 11 is provided with an annular belt member 19 made of an elastic material such as rubber, disposed along the series of sectoral elements 18 to cover the outside surface thereof as well as to bridge the adjacent sectoral elements, as better shown in FIG. 9. When the oil seal ring 11 as shown in FIGS. 8 and 9 is used, the fluid passage crossing the annular space left between the inside walls of the annular oil seal groove and the oil seal ring mounted therein is effectively intercepted by the elastic annular belt member 19 which is in tight contact with the bottom wall of the annular oil seal groove 6 due to the application of the spring forces exerted by the series of sectoral elements 18. Therefore, in this case, the annular belt member 19 operates in the same manner as the conventional O-ring, which, therefore, can be eliminated. The oil seal ring 11 attached with the annular elastic belt member 19 as shown in FIG. 8 or 9 can be prepared as a single part, which has only to be inserted into the annular oil seal groove 6 to instantly provide a completed oil seal means 4 as shown in FIG. 8. Thus, it will be appreciated that the assembling work of the oil seal means as shown in FIG. 8 is very much simplified with a correspondingly great savings in the manufacturing cost.

Figure 10:
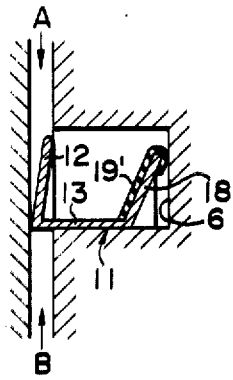

FIG. 10 shows a little modification of the structure shown in FIG. 8 wherein the oil seal ring 11 is so designed as to have an annular belt member 19' made of an elastic material such as rubber extending over the inside surfaces of a series of sectoral elements 18 in a manner to bridge the adjacent elements thereof, said annular belt member 19' being further turned around the free end portions of the sectoral elements to form a bead portion adapted to tightly contact the bottom wall portion of the annular oil seal groove 6 when the oil seal ring 11 has been inserted into the groove 6 under a slight compression thereof in the axial direction of the rotor by resiliently deforming the sectoral elements 18 to have them turned around their connecting portions with the second annular portion 13.

Figure 11:
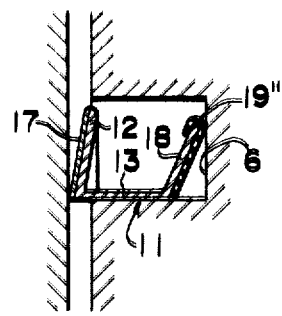
FIGS. 10 and 11 show two modifications of the structure shown in FIG. 8.

FIG. 11 shows a further modification of the structure shown in FIG. 8, wherein the oil seal ring 11 is provided with the anti-wearing film layer 17 over the outside surface of the first annular portion 12, as in the modification shown in FIG. 6. Furthermore, the annular elastic belt member in this structure is extended to turn around the free end portion of the sectoral elements 18 as shown in FIG. 11 and as differently designated by 19'', to make a distinction between the annular belt member 19 in FIG. 8.

It will be understood that the oil seal rings 11 shown in FIGS. 10 and 11 are used in quite the same manner as that shown in FIG. 8 to constitute an oil seal means and operate in quite the same manner as well.

Figure 12:
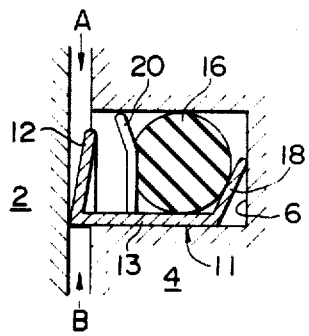
FIG. 12 is a view similar to FIG. 4 or 8 but showing a third embodiment of the oil seal means according to this invention; and, FIGS. 13, 14 and 15 show some modifications of the structure shown in FIG. 12.

FIG. 12 shows still another embodiment of this invention, wherein the oil seal ring 11 is adapted to have a first series of sectoral elements which are substantially of the same configuration as those incorporated in the oil seal ring shown in FIG. 7 as well as a second series of sectoral elements 20, said second series of sectoral elements being formed by turning up the portions which have been forming the portions disposed between the adjacent sectoral elements 18 belonging to said first series. In this structure, each of the second series of sectoral elements 20 operates independently as a leaf spring acting against the radially outer side wall of the annular oil seal groove 6 to resiliently hold the oil seal ring 11 as centered about the central axis of the annular oil seal groove 6. Furthermore, the second series of sectoral elements 20 also serves as a means for holding the conventional O-ring 16 mounted to cooperate with the annular oil seal ring 11 and to intercept the fluid passage crossing the annular space left between the wall portion of the annular oil seal groove 6 and the oil seal ring 11, whereby it is made possible to select any desired width of the second annular portion 13 to be substantially longer than the width corresponding to the diameter of the O-ring 16. Also in the structure shown in FIG. 12, the first series of sectoral elements 18 operates in substantially the same manner as those in the structure shown in FIG. 4 or other preceding figures so as to operate as leaf springs acting against the bottom wall portion of the annular oil seal groove 6 to exert an axial spring force urging the oil seal ring 11 outwardly from the groove toward the inside wall of the side housing 2.

Figure 13:
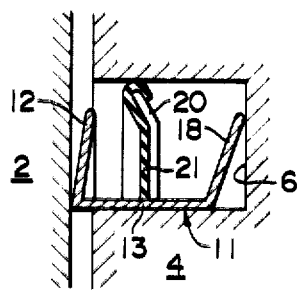

FIG. 13 shows a little modification of the structure shown in FIG. 12, wherein the conventional O-ring 16 is eliminated and to be replaced by an annular belt member 21 made of an elastic material such as rubber which extends over the series of sectoral elements 20 just as in the structure shown in FIG. 10. In this structure, the annular belt member 21 operates to intercept the fluid passage crossing the annular space left between the wall portions of the annular oil seal groove 6 and the oil seal ring 11 by being in tight contact with the radially outside wall of the groove at its beaded edge portion due to the spring action exerted by the series of sectoral elements 20.

Figure 14:
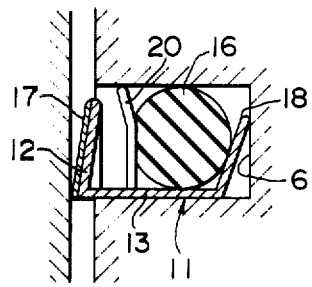
Figure 15:
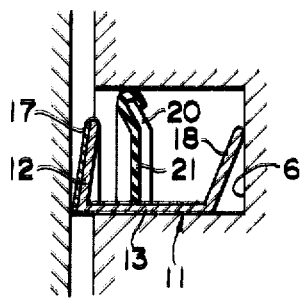

FIGS. 14 and 15 show modifications respectively of the structures shown in FIGS. 12 and 13, wherein the oil seal ring 11 is each provided with the anti-wearing film layer 17 over the outside surface of the first annular portion 12 just as in the structure shown in FIG. 6 or 11.

It will also be appreciated that the oil seal ring 11 shown in FIG. 13 or 15 is prepared as a single element to be readily inserted into the annular oil seal groove 6 to instantly complete the oil seal means 4.

We claim:

1. An oil seal means of a rotary piston engine comprising an oil seal ring and an annular elastic sealing element operatively associated therewith, both being mounted in combination in an annular oil seal groove formed as cut at a side wall portion of a rotor, characterized in that said oil seal ring is composed of a first annular portion made of a relatively thin plate extending over a substantially conical surface, said first annular portion being urged against an oppositely arranged inner wall of a side housing of the engine to contact said inner wall at its radial inner annular edge portion, a second annular portion made of a relatively thin plate extending over a substantially cylindrical surface and connected at an annular edge thereof with said radial inner annular edge of said first annular portion, said second annular portion slidably fitting over a radially inner side wall of said annular oil seal groove, and a third substantially annular portion made relatively thin and extending over a substantially conical surface and connected at an annular edge thereof with the other annular edge of said second annular portion, said third annular portion being separated into a plurality of sectoral elements arranged in series to provide as a whole a substantially annular element, said sectoral elements each acting as a spring means to urge said radially inner annular edge portion of said first annular portion against said inner wall of said side housing.

2. An oil seal means according to claim 1, wherein said sectoral elements are each closely arranged together and provided with a slight gap formed therebetween to separate one from the other.

3. An oil seal means according to claim 1, wherein said annular elastic sealing element is an O-ring received in a channel defined by said first, second and third annular portions.

4. An oil seal means according to claim 1, wherein said oil seal ring is provided with a thin anti-wearing layer at least at an outer surface of said first annular portion.

5. An oil seal means according to claim 1, wherein said third annular portion is inclined with respect to a bottom wall of the annular oil seal groove.

6. An oil seal means according to claim 1, wherein said sectoral elements are each substantially spaced from each other in that the portions which were disposed therebetween are displaced therefrom.

7. An oil seal means according to claim 6, wherein said annular elastic sealing element is a flat belt ring attached to and bridging said leaf spring members.

8. An oil seal means according to claim 6, wherein said displaced portions are displaced so as to form a plurality of leaf spring members of the oil seal ring reacting against a side wall portion of said annular oil seal groove.

9. An oil seal means according to claim 8, wherein said annular elastic sealing element is an O-ring received in a channel defined by said second and third annular portions and said plurality of leaf spring members.

10. An oil seal means according to claim 8, wherein said displaced portions are turned up to form said plurality of leaf spring members which define a second series of sectoral elements.

11. An oil seal means according to claim 8, wherein said annular elastic sealing element is a flat belt ring attached to said displaced portions.

12. An oil seal means according to claim 11, wherein said annular elastic sealing element overlaps the free edge of said displaced portions.

13. An oil seal means according to claim 1, wherein said annular elastic sealing element is a flat belt ring attached to said third annular portion.

14. An oil seal means according to claim 13, wherein the third annular portion has an inside and outside surface and said annular elastic sealing element is attached to the inside surface of the third annular portion and overlaps the free edge of said third annular portion, thereby abutting against a bottom wall of the annular oil seal groove.

15. An oil seal means according to claim 13, wherein the third annular portions have an inside and outside surface and said annular elastic sealing element is attached to the outside surface of the third annular portion which faces a bottom wall of the annular oil seal groove, said annular elastic sealing element abutting against said bottom wall at its outer free edge portion.

16. An oil seal means according to claim 15, wherein said annular elastic sealing element overlaps the free edge of said third annular portion to the inside surface thereof.

* * * * *